US008335861B2

(12) United States Patent
Sun et al.

(10) Patent No.: US 8,335,861 B2
(45) Date of Patent: Dec. 18, 2012

(54) METHOD AND SYSTEM FOR PROCESSING CORRECTION FIELD INFORMATION

(75) Inventors: Wenhua Sun, Shenzhen (CN); Xiaobo Wang, Shenzhen (CN); Bingbo Li, Shenzhen (CN); Wenguang Xu, Shenzhen (CN); Shengbing Yang, Shenzhen (CN); Youhao Deng, Shenzhen (CN); Jihui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 12/969,823

(22) Filed: Dec. 16, 2010

(65) Prior Publication Data
US 2011/0087803 A1 Apr. 14, 2011

Related U.S. Application Data (63) Continuation of application No. PCT/CN2009/072256, filed on Jun. 12, 2009.

(30) Foreign Application Priority Data

Jun. 23, 2008 (CN) .......................... 2008 1 0115415

(51) Int. Cl.
*G06F 15/16* (2006.01)
*H04J 3/06* (2006.01)
*H04L 12/43* (2006.01)

(52) U.S. Cl. ......... 709/248; 370/455; 370/503; 370/509

(58) Field of Classification Search .................. 370/503, 370/455, 509; 375/354, 355; 713/401, 400; 356/3.02; 455/3.02
See application file for complete search history.

(56) References Cited

U.S. PATENT DOCUMENTS

| | | | | |
|---|---|---|---|---|
| 7,379,480 | B2 * | 5/2008 | Balasubramanian et al. | 370/516 |
| 7,590,151 | B2 * | 9/2009 | Middleton et al. ............ | 370/516 |
| 7,649,912 | B2 * | 1/2010 | Balasubramanian et al. | 370/509 |
| 7,689,854 | B2 * | 3/2010 | Ilnicki et al. .................. | 713/400 |
| 7,778,283 | B2 * | 8/2010 | Eidson ........................ | 370/503 |
| 7,903,681 | B2 * | 3/2011 | Roberts et al. ................ | 370/438 |
| 8,090,972 | B2 * | 1/2012 | Bengtson et al. ............. | 713/400 |

(Continued)

FOREIGN PATENT DOCUMENTS

CN 1845546 A 10/2006

(Continued)

OTHER PUBLICATIONS

IEEE 1588: An Update on the Standard and its Application, John C. Eidson, Jan. 1, 2007.*

(Continued)

*Primary Examiner* — Joseph Avellino
*Assistant Examiner* — Mahran Abu Roumi (57) ABSTRACT

A method and system for processing correction field information are provided. The method includes: receiving a packet, and obtaining a first correction value carried by the packet; obtaining first time information and second time information; obtaining a second correction value according to the first correction value and the first time information; setting the second correction value in the packet; setting the second time information in the packet; obtaining third time information and fourth time information; obtaining a third correction value according to the second correction value, the second time information, the third time information, and the fourth time information; and setting the third correction value in the packet. The processing of the time information and the processing of the correction field information are performed with a set of processing mechanism, and the implementation is simpler.

10 Claims, 9 Drawing Sheets

U.S. PATENT DOCUMENTS

| | | | |
|---|---|---|---|
| 8,189,624 B2* | 5/2012 | Sakurada et al. | 370/503 |
| 2003/0128987 A1* | 7/2003 | Mayer | 398/98 |
| 2004/0081153 A1* | 4/2004 | Mayer et al. | 370/392 |
| 2004/0223518 A1 | 11/2004 | Repko et al. | |
| 2008/0080562 A1* | 4/2008 | Burch et al. | 370/503 |
| 2008/0175275 A1* | 7/2008 | Garner et al. | 370/503 |
| 2010/0085885 A1* | 4/2010 | Sakurada et al. | 370/252 |
| 2012/0014377 A1* | 1/2012 | Joergensen et al. | 370/352 |

FOREIGN PATENT DOCUMENTS

| | | |
|---|---|---|
| CN | 101080889 A | 11/2007 |
| CN | 101202613 A | 6/2008 |
| WO | 2007098775 A1 | 9/2007 |

OTHER PUBLICATIONS

IEEE 1588, Standard for a Precision Clock Synchronization Protocol, Prof. Hans Weibel, 2003.*

IEEE 1588, Standard for a Precision Clock Synchronization Protocol, Prof. Hans Weibel, Conference on Oct. 2, 2006.*

IEEE 1588: An Update on the Standard for a Precision Clock Synchronization Protocol for Networked Measurement and Control Systems, John C. Eidson, Dec. 2, 2002.*

David Rosselot: "IEEE 1588 Boundary Clock and Transparent Clock Implementation Using the DP83640," National Semiconductor, Application Note 1838, Apr. 28, 2008, 6 pages.

Kuiwen Ji: "IEEE1588V2 telecom profile framework," Network Working Group, Internet Draft, Feb. 19, 2008, 14 pages.

International search report for the corresponding International application No. PCT/CN2009/072256, Sep. 17, 2009, 37 pages.

European Search report issued in corresponding European patent application No. EP09768753.7, dated Oct. 17, 2011, total 6 pages.

Rosswlot et al.: "IEEE 1588 Boundary Clock and Transparent Clock Implementation Using the DP83640," XP008143402, Apr. 28, 2008, total 6 pages.

Written Opinion issued in corresponding PCT application No. PCT/CN2009/072256, dated Sep. 17, 2009, total 4 pages.

* cited by examiner

METHOD AND SYSTEM FOR PROCESSING CORRECTION FIELD INFORMATION

FIELD OF THE TECHNOLOGY

The present invention relates to the field of network communication, and more particularly to a method and system for processing correction field information.

BACKGROUND OF THE INVENTION

With the rapid development of the Ethernet, how to realize clock synchronization (including time synchronization and frequency synchronization) between Ethernets is an important issue. Take wireless applications as an example, presently, the accuracy of the clock is strict to mobile base stations, not only the clocks are required to be synchronous in the network, but also precise synchronization of the clocks is required. In order to achieve this objective, the mobile base stations adopt GPS for clock synchronization, but the cost of this method is very high.

In order to solve the problem of high cost of clock synchronization between the mobile base stations and the problem of precise synchronization between conventional asynchronous Ethernets, precision time protocol (PTP) of IEEE 1588 protocol is developed. The PTP protocol realizes the clock synchronization of Ethernet by transmitting a precise time stamp through a 1588 packet of the Ethernet. For example, as for the time stamp relation between a master device and a slave device, according to the time stamps between the two devices, time offset between the two devices can be calculated, thus realizing frequency modulation and time modulation of the slave device, such that the slave device can track the master device, and obtain precise frequency and time. The calculation formula of the offset is as follows:

$$\text{Offset}=[(t2-t1-t1\_\text{correction})+(t3-t4+t3\_\text{correction})]/2 \quad (1)$$

In the above formula, t1 is a time stamp that the sync message leaves the master device, and the sync message carries the time stamp t1 from the master device to the slave device; t1_correction is a sum of the resident time of the sync message in all transparent clock (TC) devices; t2 is a time stamp that the slave device receives the sync message; t3 is a time stamp that the delay_req message leaves the slave device; t3_correction is a sum of the resident time of the delay_req message in all the TC devices, and the delay_rep message carries the correction field t3_correction from the master device to the slave device; and t4 is a time stamp that the master device receives the delay_req message, and the delay_resp message carries the time stamp t4 (together with the t3_correction) from the master device to the slave device.

It can be seen from Formula (1) that, in order to make the system to be precisely synchronous, when a TC device transfers the 1588 packet, the TC device needs to calculate the precise resident time of the 1588 packet in itself. The value of the correction of the calculation formulation of the offset is a sum of the resident time in all the TC devices.

Figure 1:
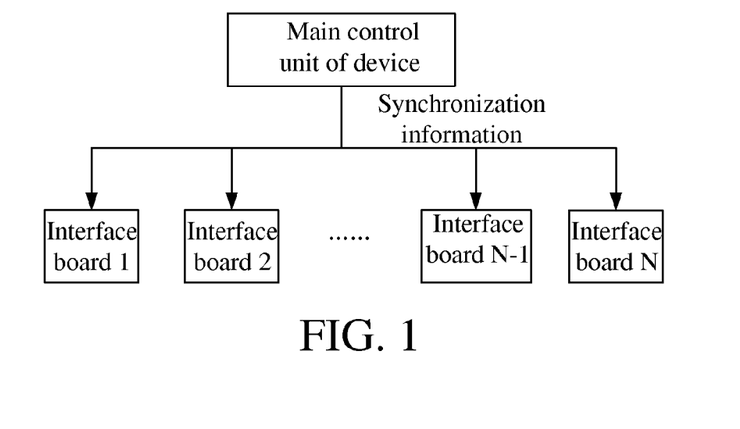
FIG. 1 is a schematic structural view of a single TC device.

As shown in FIG. 1, a schematic structural view of a single TC device is shown. A main control unit of the device sends a synchronization command every a fixed time (generally, 1 s) to synchronize all interface boards, e.g. interface board 1, interface board 2, . . . , and interface board N, such that the times of the interface boards of the whole TC device are unified, so as to realize the purpose of precisely calculating the resident time and the time stamp. According to the specification of the protocol, the formats of the time information and the correction field information are shown in Table 1 and 2 respectively.

TABLE 1

| Format of time information | |
| --- | --- |
| second value information (48 bits) | nanosecond value information (32 bits) |

TABLE 2

| Format of correction field information | | |
| --- | --- | --- |
| sign bit (1 bit) | nanosecond value information (47 bits) | decimal information of the nanosecond value (16 bits) |

When the 1588 packet enters the TC device through an uplink input port, an uplink time stamp is read, and the uplink time stamp is subtracted from the value of the correction field carried in the 1588 packet, and the result obtained by the subtraction is used to update the correction field carried in the 1588 packet; after being processed by the TC device, when the 1588 packet leaves the TC device through a downlink output port, a downlink time stamp is read, and the value of the correction field carried in the 1588 packet is added to the downlink time stamp, and a result obtained by the addition is used to update the correction field carried in the 1588 packet, thus completing the processing process of the correction field in the 1588 packet.

Figure 2:
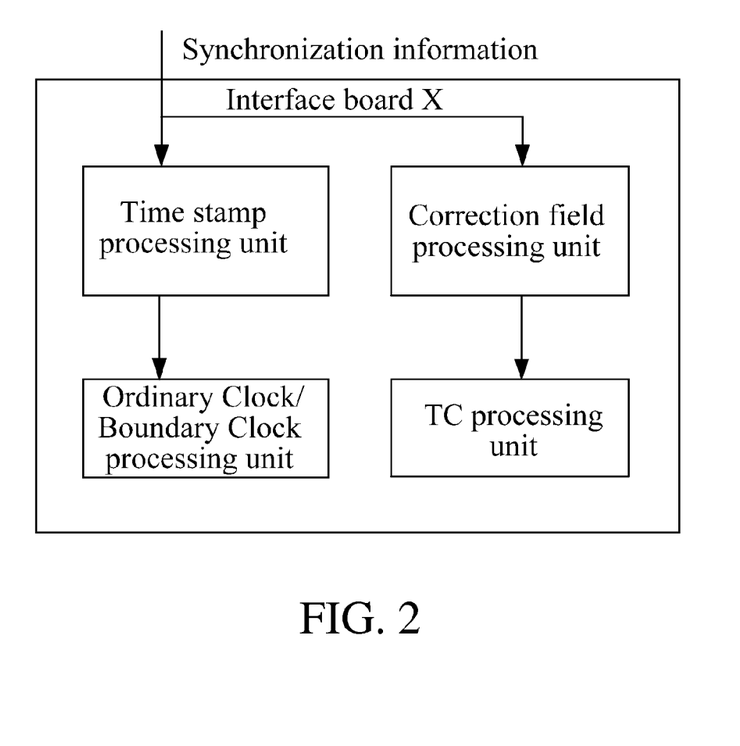
FIG. 2 is a schematic structural view of an interface board in the prior art.

The solution in the prior art has the following problems. As the formats of the time information and the correction field information are not unified (as shown in Tables 1 and 2), as for an interface board, two sets of mechanisms are needed to complete the processing of the time information of the 1588 packet and the process of the correction field information respectively. FIG. 2 is a schematic structural view of an interface board in the prior art. As shown in FIG. 2, the synchronous information is transferred to an OC/BC processing unit after being processed by a time stamp processing unit, and then transferred to a TC processing unit after being processed by a correction field processing unit, such that the complexity of the process is increased, and much resource is occupied.

SUMMARY OF THE INVENTION

The present invention is directed to a method and system for processing correction field information, such that the processing of the time information and the processing of the correction field information are performed with a set of processing mechanism, and the implementation is simpler.

In an embodiment, the present invention provides a method for processing correction field information, which includes the following blocks.

receiving a packet carrying correction field information, and obtaining a first correction value contained in the correction field information;

obtaining first time information and second time information according to a time for the packet entering device; the first time information is nanosecond value information, the second time information is second value information;

obtaining a second correction value according to the first correction value and the first time information;

updating a first correction value in the correction field information to be the second correction value, and inserting the second time information into the correction field information;

obtaining third time information and fourth time information according to a time for packet exiting device; the third time information is nanosecond value information, the fourth time information is second value information;

obtaining a third correction value according to the second correction value, the second time information, the third time information, and the fourth time information; and updating the second correction value in the correction field information to be the third correction value.

In an embodiment, the present invention provides a system includes:

a first correction value acquiring unit, adapted to receive a packet carrying correction field information, and obtain a first correction value contained in the correction field information;

a first time acquiring unit, adapted to obtain first time information and second time information according to a time for the packet entering device; the first time information is nanosecond value information, the second time information is second value information;

a second correction value acquiring unit, adapted to obtain a second correction value according to the first correction value and the first time information;

a second correction value setting unit, adapted to update the first correction value in the correction field information to be the second correction value;

a second time information setting unit, adapted to insert the second time information into the correction field information;

a second time acquiring unit, adapted to obtain third time information and fourth time information according to a time for the packet exiting device; the third time information is nanosecond value information, the fourth time information is second value information;

a third correction value acquiring unit, adapted to obtain a third correction value according to the second correction value, the second time information, the third time information, and the fourth time information; and a third correction value setting unit, adapted to update the second correction value in the correction field information to be the third correction value.

In the present invention, second time information and a second correction value obtained according to a first correction value and first time information are set in a packet, and then a third correction value is obtained according to the second correction value, the second time information, third time information, and fourth time information, such that the processing of the time information and the processing of the correction field information are performed with a set of processing mechanism, and the implementation is simpler.

DETAILED DESCRIPTION OF THE EMBODIMENTS

The technical solutions of the present invention are further described in detail with reference to the accompanying drawings and the following embodiments.

Figure 3:
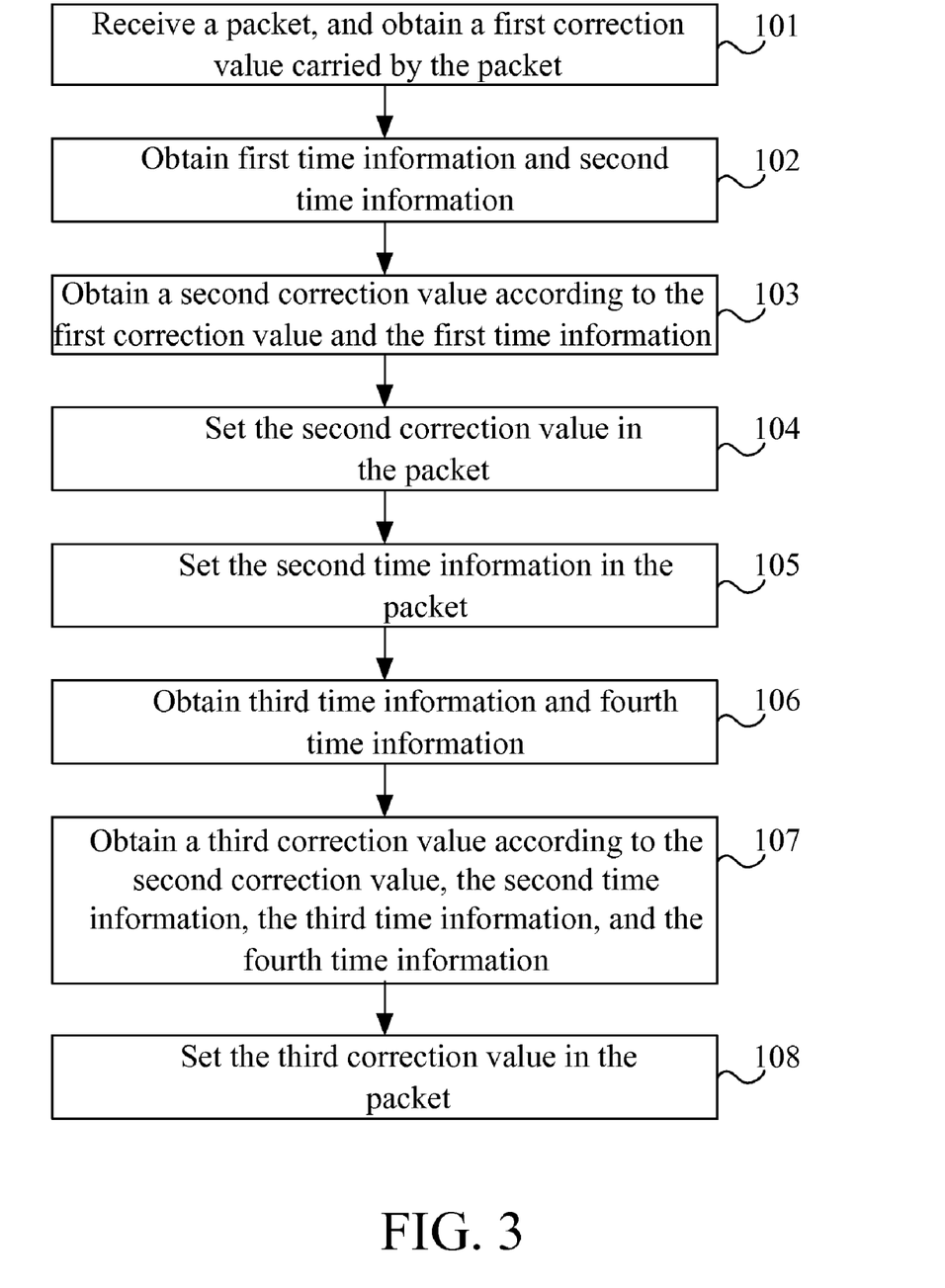
FIG. 3 is a flow chart of a method for processing correction field information according to a first embodiment of the present invention.

FIG. 3 is a flow chart of a method for processing correction field information according to a first embodiment of the present invention. As shown in FIG. 3, this embodiment includes the following blocks.

Block 101: Receive a packet, and obtain a first correction value carried by the packet.

Block 102: Obtain first time information and second time information.

Block 103: Obtain a second correction value according to the first correction value and the first time information.

Block 104: Set the second correction value in the packet.

Block 105: Set the second time information in the packet.

Block 106: Obtain third time information and fourth time information.

Block 107: Obtain a third correction value according to the second correction value, the second time information, the third time information, and the fourth time information.

Block 108: Set the third correction value in the packet.

The block 103 includes: taking a difference between all the first correction value and the first time information as the second correction value; or taking a difference between a part of the first correction value corresponding to the first time information and the first time information as the second correction value.

The block 104 includes: replacing the second correction value with part or all of the first correction value; or inserting the second correction value into the packet.

The block 105 includes: replacing part of the first correction value with the second time information; or inserting the second time information into the packet.

The block 107 includes: determining whether the fourth time information is carried according to the second time information and the fourth time information; if not, adding the third time information with the second correction value to obtain the third correction value; if yes, converting the carried part into fifth time information corresponding to the format of the third time information, and obtaining the third correction value according to a sum of the fifth time information, the third time information, and the second correction value.

A flag bit may be set in the second correction value, so as to identify whether the second correction value is a positive value or a negative value.

The first time information and the third time information can be nanosecond value information, and the second time information and the fourth time information can be second value information.

The number of bits (binary) of the second correction value may be any one of 1 bit to 63 bits, and the number of bits of the second time information may be any one of 1 bit to 63 bits; and a sum of the number of bits of the second correction value and the number of bits of the second time information is smaller than or equal to 64.

In the present invention, second time information and a second correction value obtained according to a first correction value and first time information are set in a packet, and then a third correction value is obtained according to the second correction value, the second time information, third time information, and fourth time information, such that the processing of the time information and the processing of the correction field information are completed with a set of processing mechanism, and the implementation is simpler. Furthermore, in this embodiment, subtraction of all or part of the first correction value and the first time information can be performed, and compared with the prior art, the complexity of the processing is reduced, thus reducing the occupied resource and the implementation cost.

According to the present invention, 1588 packet can be processed. The 1588 protocol defines two delay modes: P2P and E2E. The difference between the two delay modes mainly lies in that, the P2P mode calculates the link delay in the 1588 device which is between the slave device and the master device; and the E2E mode directly calculates the physical link delay between the slave device and the master device. As for the embodiments of the present invention, the delay mechanism processing principles of the P2P and the E2E are same, so hereinafter, take the E2E delay mode as an example, the technical solution of the present invention is described.

Figure 4:
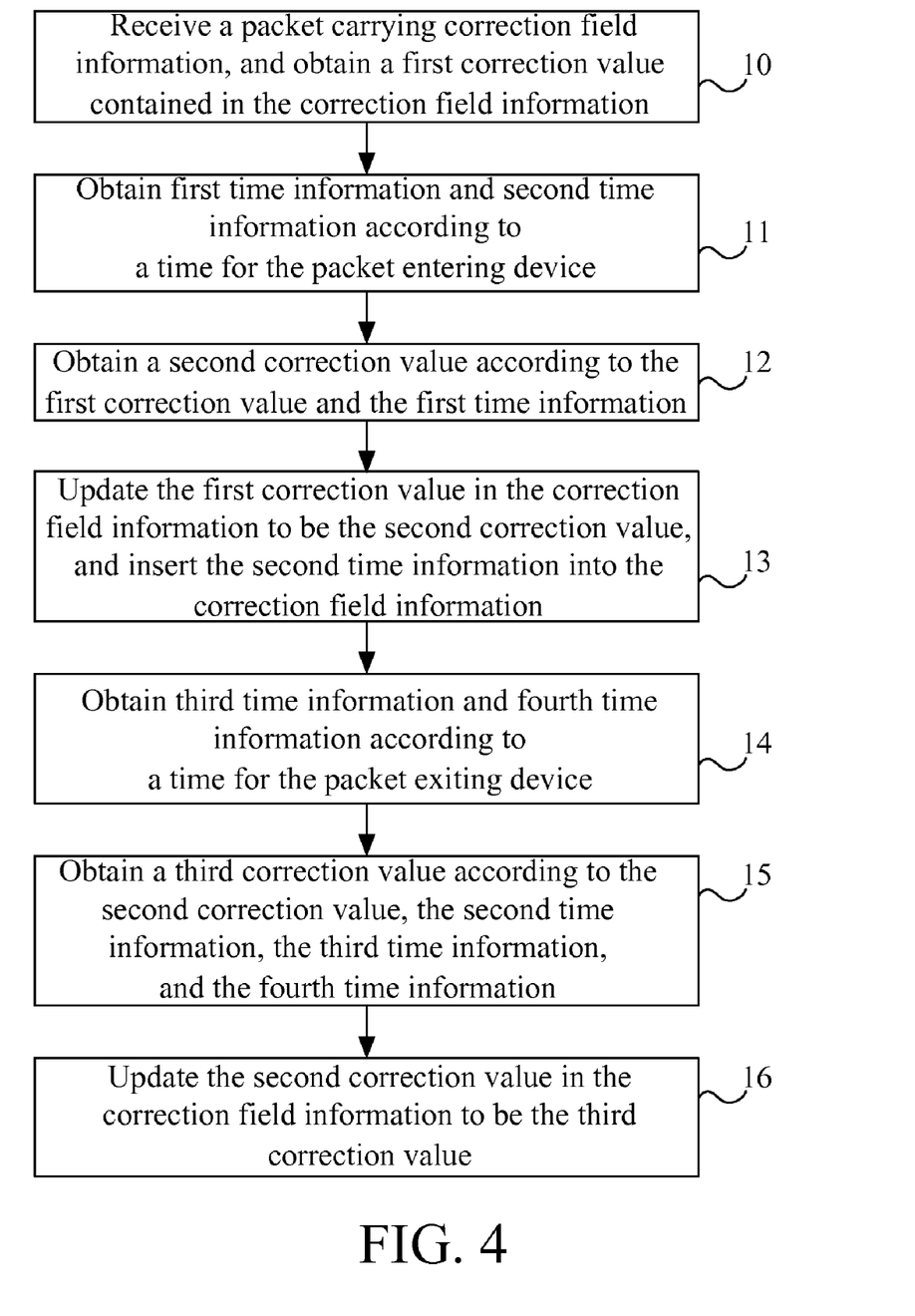
FIG. 4 is a flow chart of a method for processing correction field information according to a second embodiment of the present invention.

FIG. 4 is flow chart of a method for processing correction field information according to a second embodiment. As shown in FIG. 4, this embodiment includes the following blocks.

Block 10: Receive a packet carrying correction field information, and obtain a first correction value contained in the correction field information.

Block 11: Obtain first time information and second time information according to a time for the packet entering device.

Block 12: Obtain a second correction value according to the first correction value and the first time information.

Block 13: Update the first correction value in the correction field information to be the second correction value, and insert the second time information into the correction field information.

Block 14: Obtain third time information and fourth time information according to a time for the packet exiting device.

Block 15: Obtain a third correction value according to the second correction value, the second time information, the third time information, and the fourth time information.

Block 16: Update the second correction value in the correction field information to be the third correction value.

In this embodiment, the first time information and the third time information are nanosecond value information, and the second time information and the fourth time information are second value information.

Furthermore, the block 12 includes: taking a difference of the first correction value and the first time information as the second correction value; or taking a difference of part of the first correction value corresponding to the first time information and the first time information as the second correction value.

The block 15 includes: determining whether the fourth time information is carried according to the second time information and the fourth time information, and if not, adding the third time information with the second correction value to obtain the third correction value; if yes, converting the carried part into fifth time information corresponding to the third time information format, and obtaining the third correction value according to a sum of the fifth time information, the third time information, and the second correction value.

This embodiment may further include setting a flag bit in the correction field information to identify whether the second correction value is a positive value or a negative value.

A second value bit may also be set in the correction field information, and the inserting the second time information into the correction field information in block 13 includes: inserting the second time information into the second value bit of the correction field information.

In this embodiment, a number of bits (binary) of the second correction value is any one of 1 bit to 63 bits; and a number of bits of the second time information is any one of 1 bit to 63 bits; and a sum of the number of bits of the second correction value and the number of bits of the second time information is smaller than or equal to 64.

According to this embodiment, the second time information and the second correction value obtained according to the first correction value and first time information are inserted into the correction field information, and then the third correction value is obtained according to the second correction value, the second time information, the third time information, and the fourth time information, such that the processing of the time information and the processing of the correction field information are performed with a set of processing mechanism, and the implementation is simpler.

Figure 5:
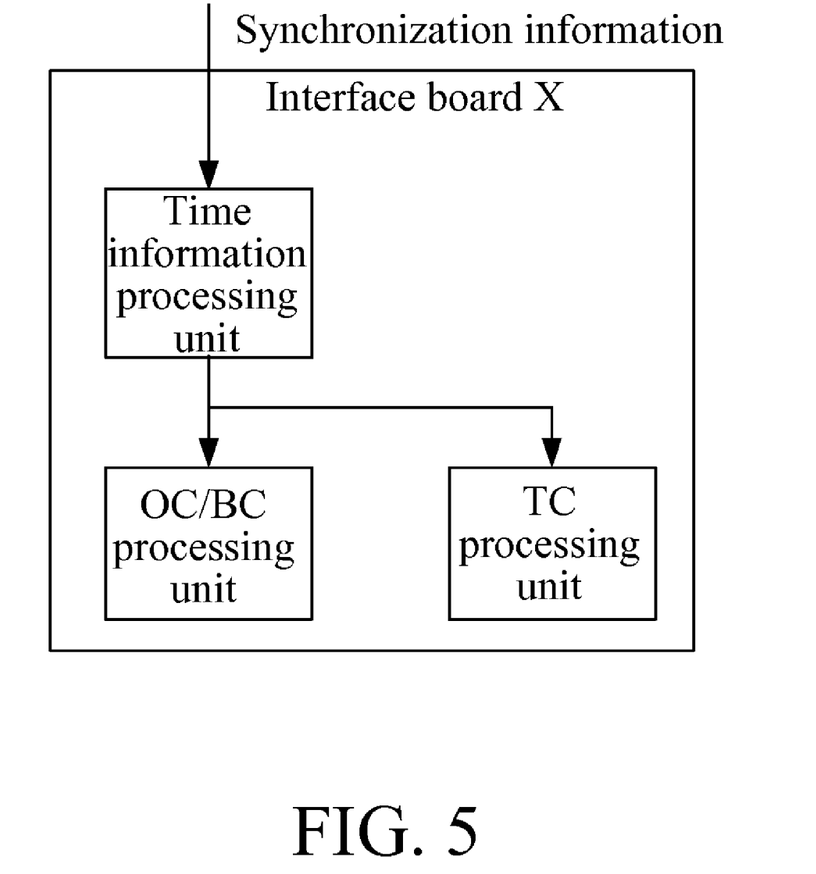
FIG. 5 is a schematic structural view of an interface board in a method for processing correction field information according to a third embodiment of the present invention.

FIG. 5 is a schematic structural view of an interface board in a method for processing correction field information according to a third embodiment of the present invention. As shown in FIG. 5, after passing through a time information processing unit, synchronization information (sync information) is transferred to an OC/BC processing unit and a TC processing unit. For the characteristics of the transmission network, the time that it takes to transfer a packet in the network is always smaller than 1 hour (in which 1 hour is 0d3600000000000ns in decimal system, and is 0x34630B8A000ns in hexadecimal system). Assume that the preset time is 1 hr, high 5 bits of the 47 bits nanosecond value information in the correction field information are constantly 0, high 5 bits are not involved in counting, such that the bits which is not involved in counting can be used to transfer other information. Next, the resident time of the packet in a single TC device is analyzed, and the processing time of a packet processed by a switching or routing device is generally at most at millisecond level. The processing time of the packet by a TC device is assumed to be smaller than 3 s, and thus it merely needs 2 bits to transfer the second value information. It can be known from the above analysis that, 2 bits can be selected in the high 5 bits in the 47 bits nanosecond value information in the correction field information which are constantly 0, so as to transfer the second value information.

This embodiment is not limited to adopt the high 5 bits in the correction field information to transfer other information, and in this case, the transfer time of the packet in the network may be smaller than 1 hr; and according to the actual situation of the network, the transmission time of the packet in the network may be smaller than other times, for example, the preset time may be 1 s, 2 s, or 1 min. This embodiment is not limited to transfer the second value information by using 2 bits, and in this case, the processing time of a packet by a TC device may be smaller than 3 s; and according to the actual situation of the network, the processing time of a packet by the TC device may also be smaller than other time, for example, 1 s, 2 s, or 1 min.

Based on the above analysis, this embodiment re-defines the format of the time information of entering/exiting device and the format of the correction field information in the packet, which are as shown in Tables 3 and 4.

TABLE 3

Format of the time information of entering/exiting device of embodiment two

| second value (48 bits) | nanosecond value (32 bits) | nanosecond decimal value (16 bits) |
|---|---|---|

TABLE 4

Format of the correction field information according to the second embodiment

| sign (1 bits) | second value (2 bits) | reserved (3 bits) | nanosecond value (42 bits) | nanosecond decimal value (16 bits) |
|---|---|---|---|---|

Figure 6A:
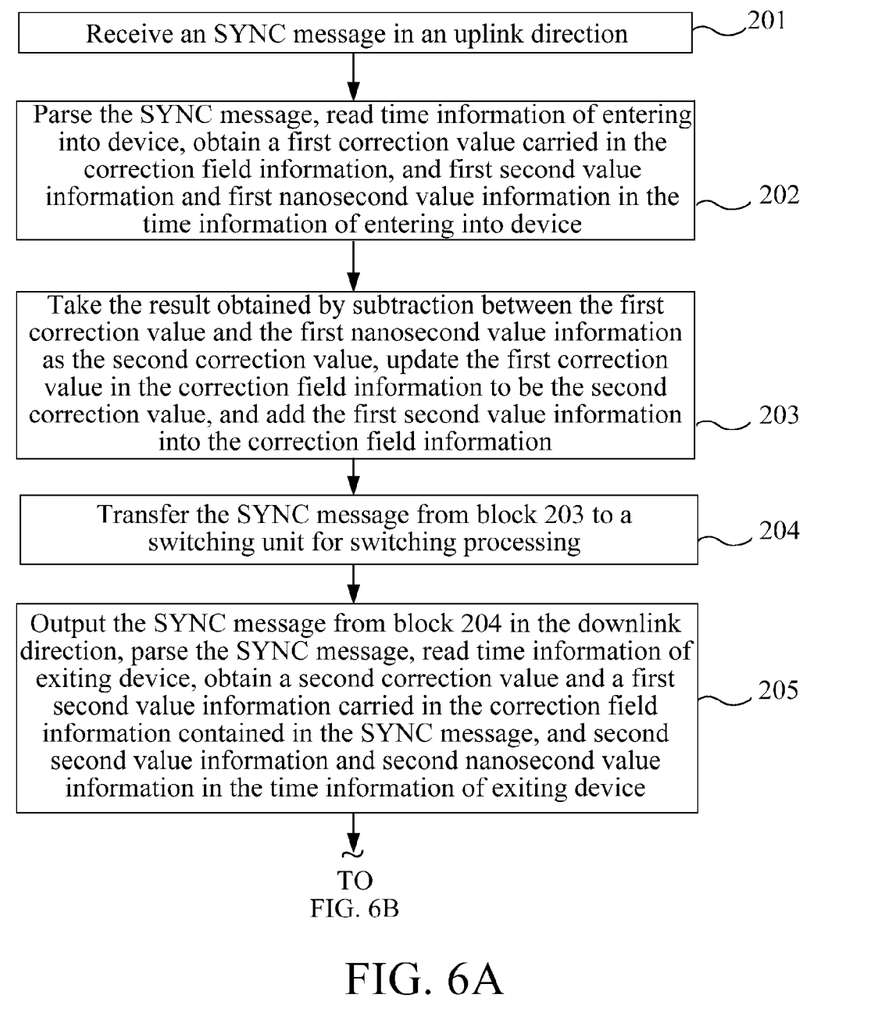
FIG. 6 is a flow chart of the method for processing correction field information according to the third embodiment of the present invention.
Figure 6B:
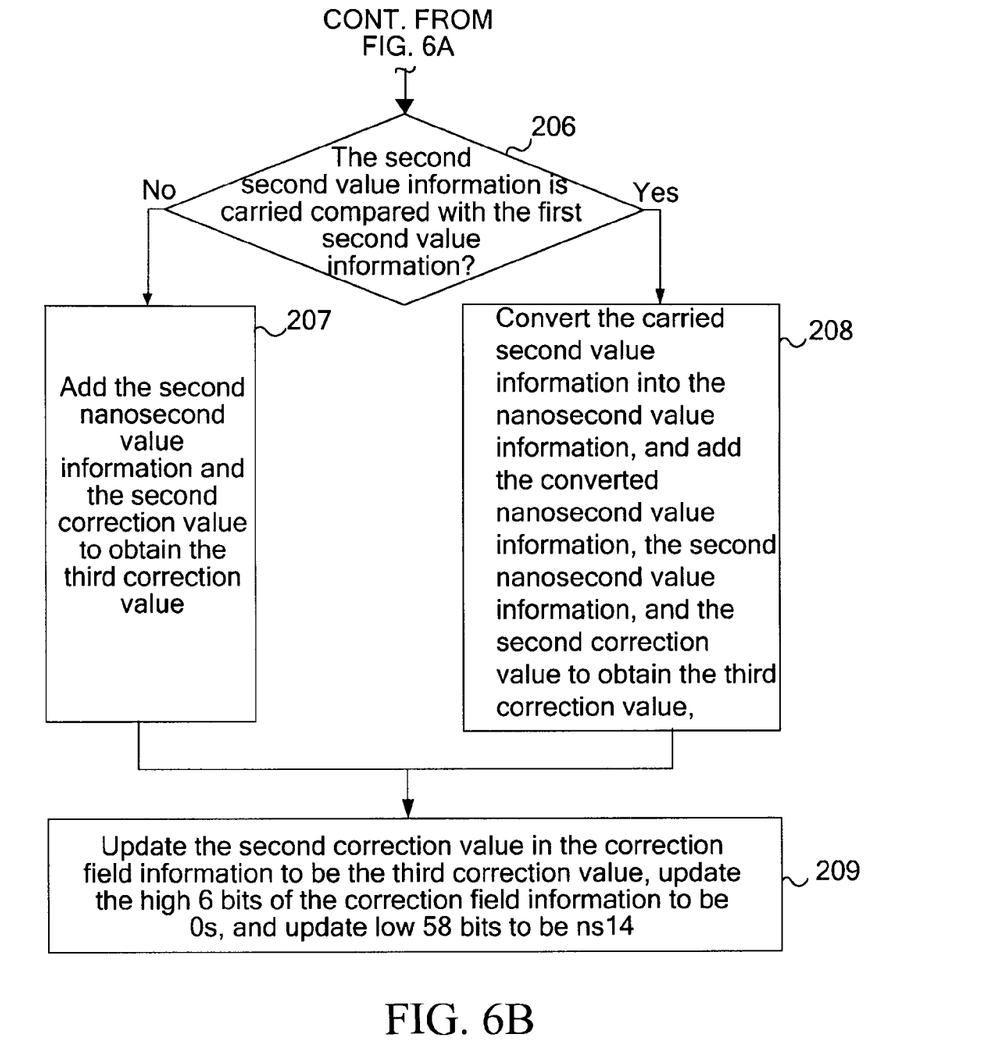

FIG. 6 (FIG. 6A and FIG. 6B) is a flow chart of a method for processing correction field information according to a third embodiment of the present invention. In this embodiment, it is assumed that the packet is an SYNC message (the processing flow of the other event messages is the same as that of the SYNC message), the correction field information in the SYNC message is 0x0001000000002000, time information of an SYNC message uplink input port (time information of entering device) is 0x0000000123453B9A00003000, and time information of an SYNC message downlink output port (time information of exiting device) is 0x00000001234600010004000. As shown in FIG. 6, in the TC mode, this embodiment includes the following blocks.

Block 201: Receive an SYNC message in an uplink direction, where the SYNC message includes correction field information.

Block 202: Parse the SYNC message, read time information of (packet) entering device, and obtain a first correction value carried in the correction field information, and first second value information and first nanosecond value information in the time information of entering device.

The first correction value which is expressed as ns11, is a value of the 42 bits nanosecond value and the 16 bits nanosecond decimal value in the correction field information. The first second value information which is expressed as s11, is the low 2 bits information of a 48 bits second value in time information of an uplink direction input port. The first nanosecond value information which is expressed as ns12, is a value of the 32 bits nanosecond value and the 16 bits nanosecond decimal value in time information of an uplink direction input port. The values of ns11, s11, and ns12 are as follows:

$ns11=0x001000000002000;$ $s11=0x1;$ $ns12=0x3B9A00003000.$

Block 203: Take the result obtained by subtraction between the first correction value and the first nanosecond value information as the second correction value, update the first correction value in the correction field information to be the second correction value, and add the first second value information into the correction field information.

$ns11-ns12=0x000C465FFFFF000$

The $1^{st}$-$58^{th}$ bits of the correction field information are updated to be ns11−ns12, and s11 is added to the bits position which is not involved in counting of the preset time of the correction field information. In this embodiment, the $63^{rd}$ bit and the $62^{nd}$ bit are selected. The correction field information after being processed in this block is 0x2000C465FFFFF000, and the $64^{th}$-$61^{st}$ bit are 0010.

Block 204: Transfer the SYNC message from block 203 to a switching unit for switching processing.

Block 205: Output the SYNC message from block 204 in the downlink direction, parse the SYNC message, read time information of exiting device, obtain a second correction value and a first second value information carried in the correction field information contained in the SYNC message, and second second value information and second nanosecond value information in the time information of exiting device.

The second correction value carried in the correction field information is ns11−ns12, and the first second value information is s11. The second second value information in the time information of exiting device is low 2 bits information of the 48 bits second value in the time information of the downlink direction output port, the second second value information is expressed as s12. The second nanosecond value information which is expressed as ns13, is a value of the 32 bits nanosecond value and the 16 bits nanosecond decimal value in the time information of a downlink direction output port. The values of s12 and ns13 are as follows:

$s12=0x2;$ $ns13=0x000100004000.$

Block 206: Determine whether the second second value information is carried compared with the first second value information according to the first second value information and the second second value information, and if not, block 207 is performed; otherwise, block 208 is performed.

According to the assumed values in this embodiment, s12 is carried as compared with s11, so block 208 is performed.

Block 207: Add the second nanosecond value information and the second correction value to obtain the third correction value, and proceed with block 209.

Block 208: Convert the carried second value information into the nanosecond value information, and add the converted nanosecond value information, the second nanosecond value information, and the second correction value to obtain the third correction value, and proceed with block 209.

The converting the carried second value information into the nanosecond value information includes calculating (s12−s11)*0x3B9ACA000000, in which is equal to 0x3B9ACA000000ns; and the third correction value (expressed as ns14) is as follows:

$ns14=(s12-s11)*0x3B9ACA000000+ns13+ns11-ns12=0x00010001CA003000$

Block 209: Update the second correction value in the correction field information to be the third correction value, update the high 6 bits of the correction field information to be 0 s, and update low 58 bits to be ns14.

In this embodiment, not only the $63^{rd}$ bit and the $62^{nd}$ bit of the correction field information are used to transfer the second value information, other bits can be selected according to the actual situation. This embodiment is not limited to use the $48^{th}$-$1^{st}$ bit of the correction field information to transfer the nanosecond value information, and other bits can be selected according to the actual situation.

It can be seen from the above description, this embodiment has the following advantages.

(1) The format of the correction field information specified in the protocol is modified (as shown in Tale 4), such that the format of the modified correction field information and the format of the time information of entering/exiting device are integrated; then, a correction value is obtained according to the second value information and the nanosecond value information carried in the time information of entering/exiting device, and the first second value information is added into the correction field information. Some bits in the correction field information are used to transfer the second value information, such that the processing of the packet time information and the processing of the correction field information are performed with a set of processing mechanism, and the implementation is simpler.

(2) In this embodiment, an operation of subtraction between the first nanosecond value information and the first correction value is performed, and the 48 bits nanosecond information is involved. Compared with the 63 bits computation in the prior art, the complexity of the processing is reduced, thus reducing the occupied resource and the implementation cost.

Figure 7A:
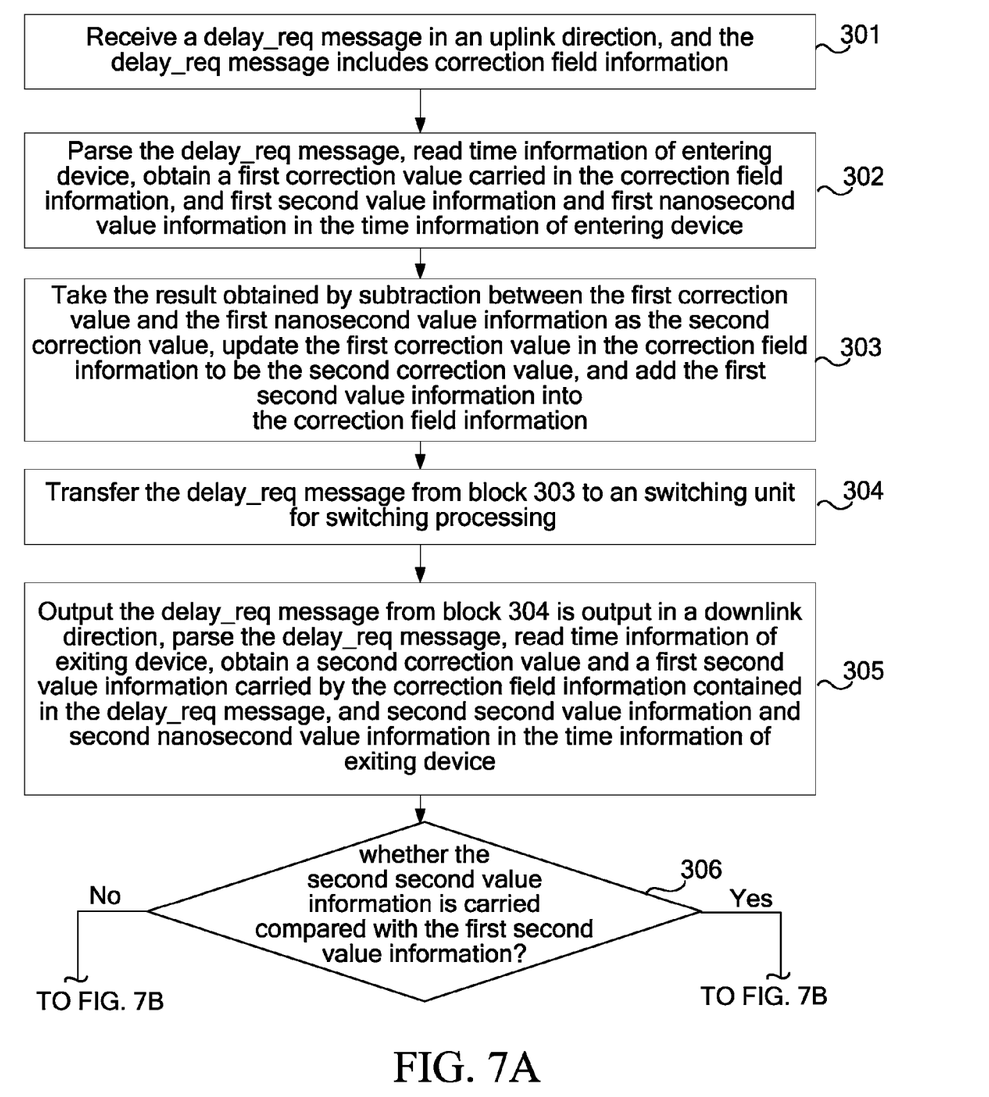
FIG. 7 is a flow chart of a method for processing correction field information according to a fourth embodiment of the present invention.
Figure 7B:
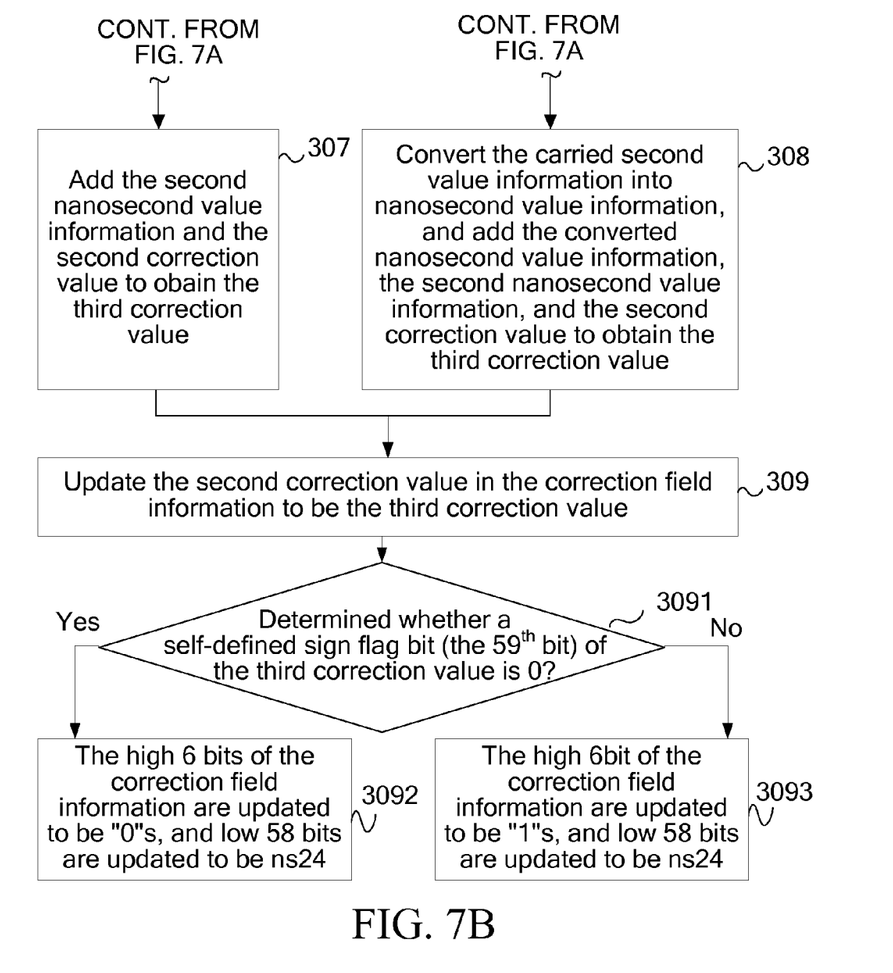

FIG. 7 (FIG. 7A and FIG. 7B) is a flow chart of a method for processing correction field information according to a fourth embodiment of the present invention. In this embodiment, an interface board structure as shown in FIG. 5 can also be used. Due to asymmetric transfer link, the correction value in the packet may be a negative value. As the compensation of asymmetric delay negative value of the transmission link is very small, the transmission time of the packet in the network is always smaller than 1 hr (negative 1 hr is −3600000000000 in the decimal system, and is 0xFCB9CF476000 in the hexadecimal system). Assume that the preset time is 1 hr, high 5 bits of the 47 bit nanosecond value information in the correction field information are constantly 1, high 5 bits are not involved in counting, such that the high 5 bits which is not involved in counting can be used to transfer other information. Next, the resident time of the packet in a single TC device is analyzed, and the processing time of a packet processed by a switching or routing device is generally at most at millisecond level. The processing time of the packet by a TC device is assumed to be smaller than 3 s, thus it merely needs 2 bits to transfer the second value information. It can be known from the above analysis that, 2 bits can be selected in the high 5 bits in the 47 bits nanosecond value information in the correction field information which are constantly 1, so as to transfer the second value information.

This embodiment is not limited to adopt the high 5 bits in the correction field information to transfer other information, and in this case, the transmission time of the packet in the network may be smaller than 1 hr; and according to the actual situation of the network, the transmission time of the packet in the network may also be smaller than other times, for example, the preset time may be 1 s, 2 s, or 1 min. This embodiment is not limited to transfer the second value information by using 2 bits, and in this case, the processing time of a packet by a TC device may also be smaller than 3 s; and according to the actual situation of the network, the processing time of a packet by the TC device may also be smaller than other time, for example, 1 s, 2 s, or 1 min.

Based on the above analysis, this embodiment re-defines the format of the time information of entering/exiting device and the format of the correction field information in the packet, which are as shown in Tables 5 and 6.

TABLE 5

Formate of the time information of entering/exiting device of embodiment three

| second value (48 bits) | nanosecond value (32 bits) | nanosecond decimal value (16 bits) |
|---|---|---|

TABLE 6

Format of correction field information of embodiment three

| sign defined in the protocol (1 bit) | second value (2 bits) | 2 bit reserved (2 bits) | Self-defined sign (1 bit) | nanosecond value (42 bits) | nanosecond decimal value (16 bits) |
|---|---|---|---|---|---|

In this embodiment, it is assumed that the packet is a delay (delay_req) message (the processing flow of an event message is the same as that of a delay_req message), correction field information in the delay_req message is 0xFFFFFFFFFF002000, time information of a delay_req message uplink direction input port (time information of entering device) is 0x0000000123453B9A00003000, and time information of a delay_req message downlink direction output port (time information of exiting device) is 0x00000001234600010000400. As shown in FIG. 7, in the TC mode, this embodiment includes the following blocks.

Block 301: Receive a delay_req message in an uplink direction, where the delay_req message includes correction field information.

Block 302: Parse the delay_req message, read time information of (packet) entering device, obtain a first correction value carried in the correction field information, and first second value information and first nanosecond value information in the time information of entering device.

The first correction value which is expressed as ns21, is a value of the 42 bits nanosecond value and the 16 bits nanosecond decimal value in the correction field information. The first second value information which is expressed as s21, is the low 2 bits information of a 48 bits second value in time information of an uplink direction input port. The first nanosecond value information which is expressed as ns22, is a value of the 32 bits nanosecond value and the 16 bits nanosecond decimal value in time information of an uplink direction input port. The values of ns21, s21, and ns22 are as follows:

$ns21=0x3FFFFFFFF002000$ $s1=0x1$ $ns2=0x3B9A00003000$

Block 303: Take the result obtained by subtraction between the first correction value and the first nanosecond value information as the second correction value, update the first correction value in the correction field information to be the second correction value, and add the first second value information into the correction field information.

$ns21-ns22=0x3FFC465FEFFF000$

The $1^{st}$-$58^{th}$ bits of the correction field information are updated to be ns21−ns22, and s21 is added to the bits position which is not involved in counting of the preset time of the correction field information. In this embodiment, the $63^{rd}$ bit and $62^{nd}$ bit are selected. The correction field information after being processed in this block is 0xBFFFC465FEFFF000, in which the $64^{th}$-$61^{st}$ bit are 1011.

Block 304: Transfer the delay_req message from block 303 to an switching unit for switching processing.

Block 305: Output the delay_req message from block 304 in a downlink direction, parse the delay_req message, read time information of exiting device, obtain a second correction value and a first second value information carried by the correction field information contained in the delay_req message, and second second value information and second nanosecond value information in the time information of exiting device.

The second correction value carried in the correction field information is ns21−ns22, and the first second value information is s21. The second second value information in the time information of exiting device is low 2 bits information of 48 bits second value in time information of a downlink direction output port, and is expressed as s22. The second nanosecond value information which is expressed as ns13, is a value of the 32 bits nanosecond value and the 16 bits nanosecond decimal value in the time information of the downlink direction output port. The values of s22 and ns23 are as follows:

s22=0x2 ns23=0x000100004000

In block 306, it is determined whether the second second value information is carried compared with the first second value information according to the first second value information and the second second value information, and if not, block 307 is performed; otherwise, block 308 is performed.

According to the assumed values in this embodiment, s22 is carried as compared with s21, so block 308 is performed.

Block 307: Add the second nanosecond value information and the second correction value to obtain the third correction value, and proceed with block 309.

Block 308: Convert the carried second value information into nanosecond value information, and add the converted nanosecond value information, the second nanosecond value information, and the second correction value to obtain the third correction value, and proceed with block 309.

The converting the carried second value information into the nanosecond value information includes: calculating (s22−s21)*0x3B9ACA000000, in which is equal to 0x3B9ACA000000ns; and the third correction value (expressed as ns24) is as follows.

ns24=(s22−s21)*0x3B9ACA000000+ns23+ns21−ns22=0x0000001C9003000

Block 309: Update the second correction value in the correction field information to be the third correction value.

After block 309, this embodiment further includes the following blocks.

In block 3091, it is determined whether a self-defined sign flag bit (the $59^{th}$ bit) of the third correction value is 0, and if yes, block 3092 is performed; otherwise, block 3093 is performed.

In block 3092, the high 6 bits of the correction field information are updated to be "0"s, and low 58 bits are updated to be ns24.

In block 3093, the high 6 bit of the correction field information are updated to be "1"s, and low 58 bits are updated to be ns24.

This embodiment is not limited to only use the $63^{rd}$ bit and the $62^{nd}$ bit of the correction field information to transfer the second value information, and other bits can be selected according to the actual situation. This embodiment is not limited to use the $48^{th}$-$1^{st}$ bits of the correction field information to transfer the nanosecond value information, and other bit position can be selected according to the actual situation; other bits may also be selected to transfer self-defined information of being negative or positive.

It can be seen from the above description, this embodiment has the following advantages.

(1) The format of the correction field information specified in the protocol is modified (as shown in Tale 6), such that the format of the modified correction field information and the format of the time information of entering/exiting device are integrated; then, according to the second value information and the nanosecond value information carried in the time information of entering/exiting device, a correction value is obtained, and the first second value information is added into the correction field information. Some bits in the correction field information are used to transfer the second value information, such that the processing of the packet time information and the processing of the correction field information are performed with a set of processing mechanism, and the implementation is simpler.

(2) In this embodiment, an operation of subtraction between the first nanosecond value information and the first correction value is performed, and the 48 bits nanosecond information is involved, and compared with the 63 bits computation in the prior art, the complexity of the processing is reduced, thus reducing the occupied resource and the implementation cost.

Figure 8:
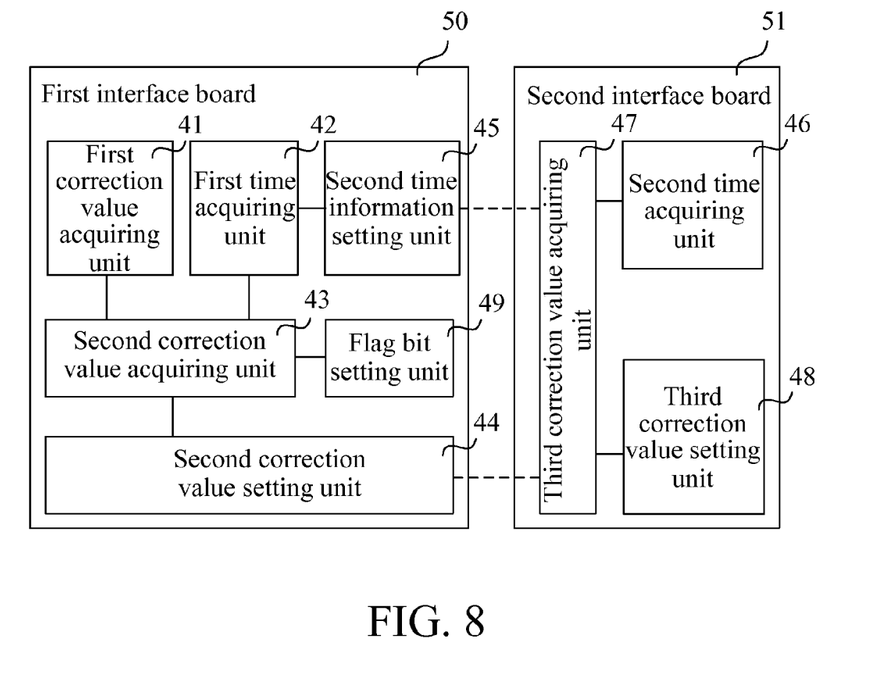
FIG. 8 is a schematic structural view of a system for processing correction field information according to an embodiment of the present invention.

FIG. 8 is a schematic structural view of a system for processing correction field information according to an embodiment of the present invention. As shown in FIG. 8, this embodiment includes a first correction value acquiring unit 41, a first time acquiring unit 42, a second correction value acquiring unit 43, a second correction value setting unit 44, a second time information setting unit 45, a second time acquiring unit 46, a third correction value acquiring unit 47, and a third correction value setting unit 48. The first correction value acquiring unit 41 is adapted to obtain a first correction value carried by a packet. The first time acquiring unit 42 is adapted to obtain first time information and second time information. The second correction value acquiring unit 43 is adapted to obtain a second correction value according to the first correction value and the first time information. The second correction value setting unit 44 is adapted to set the second correction value in the packet. The second time information setting unit 45 is adapted to set the second time information in the packet. The second time acquiring unit 46 is adapted to obtain third time information and fourth time information. The third correction value acquiring unit 47 is adapted to obtain a third correction value according to the second correction value, the second time information, the third time information, and the fourth time information. The third correction value setting unit 48 is adapted to set the third correction value in the packet.

This embodiment may further include a flag bit setting unit 49, which is adapted to set a flag bit in the second correction value according to whether the second correction value is a positive value or a negative value.

This embodiment may further include a first interface board 50 and a second interface board 51. As shown in FIG. 8, the connection relation between the first interface board 50 and the second interface board 51 is indicated by a dotted line. Specially, the first interface board 50 may be directly connected to the second interface board 51, and may also be connected to the second interface board 51 through a processing board or an exchange board. The first correction value acquiring unit 41, the first time acquiring unit 42, the second correction value acquiring unit 43, the second correction value setting unit 44, the second time information setting unit 45, and the flag bit setting unit 49 may be set on the first interface board 50. The second time acquiring unit 46, the third correction value acquiring unit 47, and the third correction value setting unit 48 may be set on the second interface board 51.

In this embodiment, the second time information is set in the packet through the second time information setting unit

45, the second correction value is set in the packet according to the second correction value obtained according to the first correction value and the first time information through the second correction value setting unit 44, the third correction value is obtained through the third correction value acquiring unit 47 according to the second correction value, the second time information, the third time information, and the fourth time information, and the third correction value is set in the packet through the third correction value setting unit 48, such that the processing of the time information and the processing of the correction field information are performed with a set of processing mechanism, and the implementation is simpler. Furthermore, the second correction value acquiring unit 43 of this embodiment can perform an operation of subtraction between all or part of the first correction value and the first time information to obtain the second correction value, and compared with the prior art, the complexity of the processing is reduced, thus reducing the occupied resource and the implementation cost.

An embodiment of the system for processing correction field information of the present invention is provided, which includes a first correction value acquiring unit, a first time acquiring unit, a second correction value acquiring unit, a second correction value setting unit, a second time information setting unit, a second time acquiring unit, a third correction value acquiring unit, and a third correction value setting unit. The first correction value acquiring unit is adapted to receive a packet carrying correction field information, and obtain a first correction value contained in the correction field information. The first time acquiring unit is adapted to obtain first time information and second time information according to a time for the packet entering device. The second correction value acquiring unit is adapted to obtain a second correction value according to the first correction value and the first time information. The second correction value setting unit is adapted to update the first correction value in the correction field information to be the second correction value. The second time information setting unit is adapted to insert the second time information into the correction field information. The second time acquiring unit is adapted to obtain third time information and fourth time information according to a time for the packet exiting device. The third correction value acquiring unit is adapted to obtain a third correction value according to the second correction value, the second time information, the third time information, and the fourth time information. The third correction value setting unit is used to update the second correction value in the correction field information to be the third correction value.

The first time information and the third time information is nanosecond value information, the second time information and the fourth time information are second value information.

This embodiment further includes a flag bit setting unit, which is adapted to set a flag bit in the correction field information according to whether the second correction value is a positive value or a negative value.

This embodiment further includes a first interface board and a second interface board. The first correction value acquiring unit, the first time acquiring unit, the second correction value acquiring unit, the second correction value setting unit, and the second time information setting unit are set on the first interface board. The second time acquiring unit, the third correction value acquiring unit, and the third correction value setting unit are set on the second interface board.

In this embodiment, the second time information is inserted in the correction field information through the second time information setting unit, the second correction value is set in the correction field information according to the second correction value obtained according to the first correction value and the first time information through the second correction value setting unit, the third correction value is obtained through the third correction value acquiring unit according to the second correction value and the second time information, and the third time information and the fourth time information, and the third correction value is set in the correction field information through the third correction value setting unit, such that the processing of the time information and the processing of the correction field information are performed with a set of processing mechanism, and the implementation is simpler.

Those of ordinary skill in the art should understand that all or a part of the blocks of the method according to the embodiments of the present invention may be implemented by a program instructing relevant hardware. The program may be stored in a computer readable storage medium. When the program is run, the blocks of the method according to the embodiments of the present invention are performed. The storage medium may be any medium that is capable of storing program codes, such as a ROM, a RAM, a magnetic disk, and an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for processing correction field information comprising:
    receiving a packet carrying correction field information, and obtaining a first correction value contained in the correction field information;
    obtaining first time information and second time information according to a time for the packet entering device, the first time information is nanosecond value information, the second time information is second value information;
    obtaining a second correction value according to the first correction value and the first time information;
    updating a first correction value in the correction field information to be the second correction value, and inserting the second time information into the correction field information;
    obtaining third time information and fourth time information according to a time for packet exiting device; the third time information is nanosecond value information, the fourth time information is second value information;
    obtaining a third correction value according to the second correction value, the second time information, the third time information, and the fourth time information; and
    updating the second correction value in the correction field information to be the third correction value.

2. The method for processing correction field information according to claim 1, wherein the obtaining the second correction value according to the first correction value and the first time information comprises:
    taking a difference between the first correction value and the first time information as the second correction value.

3. The method for processing correction field information according to claim 1, wherein the obtaining the second correction value according to the first correction value and the first time information comprises:

taking a difference between a part of the first correction value corresponding to the first time information and the first time information as the second correction value.

4. The method for processing correction field information according to claim 1, wherein the obtaining the third correction value according to the second correction value, the second time information, the third time information, and the fourth time information comprises:

determining whether the fourth time information is carried according to the second time information and the fourth time information;

if not, adding the third time information with the second correction value to obtain the third correction value; and if yes, converting the carried part into fifth time information corresponding to a format of the third time information, and obtaining the third correction value according to a sum of the fifth time information, the third time information, and the second correction value.

5. The method for processing correction field information according to claim 1, further comprising setting a flag bit in the correction field information to identify whether the second correction value is a positive value or a negative value.

6. The method for processing correction field information according to claim 1, wherein a second value bit is set in the correction field information, and the inserting the second time information into the correction field information comprises inserting the second time information into the second value bit of the correction field information.

7. The method for processing correction field information according to claim 1, wherein a number of bits of the second correction value is any one of 1 bit to 63 bits;

a number of bits of the second time information is any one of 1 bit to 63 bits; and a sum of the number of bits of the second correction value and the number of bits of the second time information is smaller than or equal to 64.

8. A system for processing correction field information, comprising:

a first correction value acquiring unit, adapted to receive a packet carrying correction field information, and obtain a first correction value contained in the correction field information;

a first time acquiring unit, adapted to obtain first time information and second time information according to a time for the packet entering device, the first time information is nanosecond value information, the second time information is second value information;

a second correction value acquiring unit, adapted to obtain a second correction value according to the first correction value and the first time information;

a second correction value setting unit, adapted to update the first correction value in the correction field information to be the second correction value;

a second time information setting unit, adapted to insert the second time information into the correction field information;

a second time acquiring unit, adapted to obtain third time information and fourth time information according to a time for the packet exiting device, the third time information is nanosecond value information, the fourth time information is second value information;

a third correction value acquiring unit, adapted to obtain a third correction value according to the second correction value, the second time information, the third time information, and the fourth time information; and a third correction value setting unit, adapted to update the second correction value in the correction field information to be the third correction value.

9. The system for processing correction field information according to claim 8, further comprising a flag bit setting unit, adapted to set a flag bit in the correction field information according to whether the second correction value is a positive value or a negative value.

10. The system for processing correction field information according to claim 8, further comprising a first interface board and a second interface board, wherein the first correction value acquiring unit, the first time acquiring unit, the second correction value acquiring unit, the second correction value setting unit, and the second time information setting unit are set on the first interface board; and the second time acquiring unit, the third correction value acquiring unit, and the third correction value setting unit are set on the second interface board.

* * * * *